(12) United States Patent
Douglass

(10) Patent No.: US 10,557,535 B2
(45) Date of Patent: Feb. 11, 2020

(54) REVERSIBLE CONTINUOUSLY SPINNING TRANSMISSION FOR ELECTRIC MOTORS

(71) Applicant: Earl Stuart Douglass, Auburn, CA (US)

(72) Inventor: Earl Stuart Douglass, Auburn, CA (US)

(*) Notice: Subject to any disclaimer, the term of this patent is extended or adjusted under 35 U.S.C. 154(b) by 282 days.

(21) Appl. No.: 15/611,634

(22) Filed: Jun. 1, 2017

(65) Prior Publication Data

US 2017/0350485 A1    Dec. 7, 2017

Related U.S. Application Data

(60) Provisional application No. 62/344,255, filed on Jun. 1, 2016.

(51) Int. Cl.
*F16H 37/00* (2006.01)
*F16H 37/02* (2006.01)
*H02K 49/10* (2006.01)

(52) U.S. Cl.
CPC ......... *F16H 37/027* (2013.01); *H02K 49/108* (2013.01)

(58) Field of Classification Search
CPC .......... F16D 27/01; F16D 27/02; F16D 11/14; F16D 2129/065; F16D 2500/10462; F16D 2500/10475; F16H 2063/3046; F16H 37/027; F16H 2063/3079; H02K 49/108
See application file for complete search history.

(56) References Cited

U.S. PATENT DOCUMENTS

| | | | | |
|---|---|---|---|---|
| 4,627,310 A | * | 12/1986 | Coburn | B25B 17/02 192/3.52 |
| 4,905,805 A | * | 3/1990 | Grimm | F16D 7/10 192/48.2 |
| 5,052,990 A | * | 10/1991 | Sakakibara | F16H 37/021 474/29 |
| 5,080,639 A | * | 1/1992 | Sakakibara | F16H 37/022 475/211 |
| 5,827,148 A | * | 10/1998 | Seto | B60W 10/10 477/15 |
| 6,367,345 B1 | * | 4/2002 | Yeh | F16H 3/14 74/377 |

(Continued)

FOREIGN PATENT DOCUMENTS

| | | | | |
|---|---|---|---|---|
| GB | 2451246 A | * | 1/2009 | B60K 6/10 |
| RU | 2216662 C1 | * | 11/2003 | F16D 27/01 |

*Primary Examiner* — Victor L Macarthur
(74) *Attorney, Agent, or Firm* — Intellectual Strategies

(57) ABSTRACT

A reversible torque transfer device includes an input shaft including a center disc, an output shaft including a first output gear and a second output gear, a first outer disc on a first side of the center disc, and a second outer disc on a second side. The first outer disc concentrically surrounds the input shaft and is configured to move translationally along the input shaft and rotate a first input gear, the first input gear being mechanically connected to the first output gear. The second outer disc concentrically surrounds the input shaft and is configured to move translationally along the input shaft and rotate a second input gear, the second input gear being mechanically connected to the second output gear. The center disc drives a rotational movement of the first and second outer discs based on a translational position of the outer discs along the input shaft.

18 Claims, 7 Drawing Sheets

(56) References Cited

U.S. PATENT DOCUMENTS

| | | | | | |
|---|---|---|---|---|---|
| 6,694,837 | B2* | 2/2004 | Yeh | ............................ | F16H 3/14 |
| | | | | | 192/105 C |
| 7,632,209 | B2* | 12/2009 | Sakamoto | ............... | B60K 6/365 |
| | | | | | 477/5 |
| 8,127,907 | B1* | 3/2012 | White | .................... | B63H 23/30 |
| | | | | | 192/21.5 |
| 9,124,163 | B2* | 9/2015 | Jang | ........................ | H02K 23/04 |
| 2007/0105680 | A1* | 5/2007 | Ulbrich | .................... | F16H 47/04 |
| | | | | | 475/72 |
| 2007/0179015 | A1* | 8/2007 | Johnson | .................. | B60K 6/485 |
| | | | | | 477/8 |
| 2013/0119670 | A1* | 5/2013 | Rosefsky | ................. | F03B 13/00 |
| | | | | | 290/54 |
| 2013/0240317 | A1* | 9/2013 | Mori | ........................ | F16D 11/14 |
| | | | | | 192/69.8 |
| 2014/0214293 | A1* | 7/2014 | Mori | .................... | F16H 61/0403 |
| | | | | | 701/60 |
| 2014/0214294 | A1* | 7/2014 | Mori | .................... | F16H 61/0437 |
| | | | | | 701/60 |
| 2014/0283637 | A1* | 9/2014 | Iwasaki | .................... | F16H 3/083 |
| | | | | | 74/335 |
| 2014/0291102 | A1* | 10/2014 | Iwasaki | ............... | F16H 61/0403 |
| | | | | | 192/69.8 |
| 2015/0207394 | A1* | 7/2015 | Albertson | ............ | H02K 49/108 |
| | | | | | 310/105 |
| 2019/0154127 | A1* | 5/2019 | Boccadamo | ............ | F16H 3/721 |

* cited by examiner

REVERSIBLE CONTINUOUSLY SPINNING TRANSMISSION FOR ELECTRIC MOTORS

CROSS-REFERENCE TO RELATED APPLICATIONS

This application claims the benefit of U.S. Provisional Patent Application Ser. No. 62/344,255 filed on Jun. 1, 2016, and entitled "Reversible Continuously Spinning Transmission for Electric Motors," the contents of which are hereby incorporated by reference herein.

BACKGROUND

Conventional electric cars typically have a single gear or fixed ratio gear box to connect the engine to the drivetrain. This is done to provide simplicity as well as for cost reasons and ultimately because electric engines produce enough power across a wider range of speeds than a traditional internal combustion engine. As such, transmissions for electric motors have conventionally been prohibitively expensive to utilize in the design of electric cars and other electric powered vehicles and machinery.

SUMMARY

The subject matter of the present application has been developed in response to the present state of the art, and in particular, in response to the problems and disadvantages associated with conventional electric motors and transmissions that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a transmission for an electric motor is disclosed, which facilitates the use of a cost effective transmission with an electric motor to allow the electric motor to continuously rotate even when an electric car is stopped or switching from forward to reverse.

Embodiments of a reversible torque transfer device are described. In one embodiment, a reversible torque transfer device includes an input shaft including a center disc, an output shaft including a first output gear and a second output gear, a first outer disc on a first side of the center disc, and a second outer disc on a second side. The first outer disc concentrically surrounds the input shaft and is configured to move translationally along the input shaft and rotate a first input gear, the first input gear being mechanically connected to the first output gear. The second outer disc concentrically surrounds the input shaft and is configured to move translationally along the input shaft and rotate a second input gear, the second input gear being mechanically connected to the second output gear. The center disc drives a rotational movement of the first and second outer discs based on a translational position of the outer discs along the input shaft. Other embodiments of a reversible torque transfer device are described.

Embodiments of a system are described. In one embodiment, a system includes an electric motor and a transmission. The transmission includes an input shaft including a center disc, an output shaft including a first output gear and a second output gear, a first outer disc on a first side of the center disc, and a second outer disc on a second side. The first outer disc concentrically surrounds the input shaft and is configured to move translationally along the input shaft and rotate a first input gear, the first input gear being mechanically connected to the first output gear. The second outer disc concentrically surrounds the input shaft and is configured to move translationally along the input shaft and rotate a second input gear, the second input gear being mechanically connected to the second output gear. The center disc drives a rotational movement of the first and second outer discs based on a translational position of the outer discs along the input shaft. Other embodiments of a transmission for an electric motor are described.

Other aspects and advantages of embodiments of the present invention will become apparent from the following detailed description, taken in conjunction with the accompanying drawings illustrated by way of example of the principles of the invention.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

Figure 1:
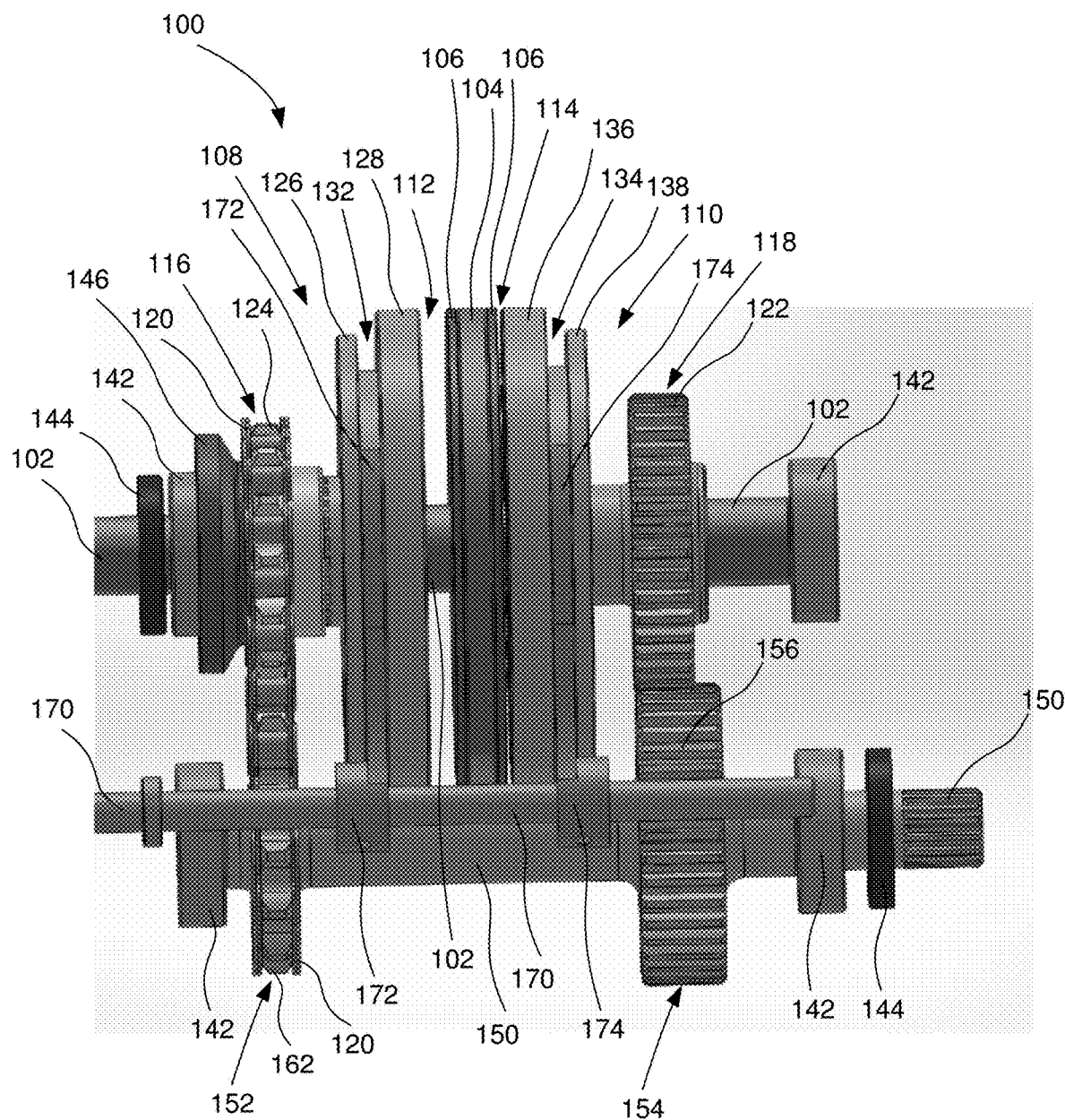
FIG. 1 is a side view of a reversible torque transfer device, according to one or more embodiments of the present disclosure.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

Throughout the description, similar reference numbers may be used to identify similar elements.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Other aspects, as well as features and advantages of various aspects, of the disclosed subject matter will be apparent to those of ordinary skill in the art through consideration of this disclosure and the appended claims.

This application relates generally to embodiments of a reversible torque transfer device. This transmission design of embodiments of the reversible torque transfer device may be used in many different applications. The example used for the illustrative purposes is a reversible clutch for electric vehicles. Embodiments may be used for various vehicles and/or machinery utilizing an electric motor. Embodiments may be used for transferring torque for any number of applications.

Extensive prior art exists in the field of vehicle transmissions. All of these designs are compatible with internal combustion engines (ICE). The evolution of the electric vehicle (EV) industry has presented a unique opportunity for the development of a transmission suitable for both the AC and DC electric motors.

The power curve of the ICE motor is most efficient at 2-3K RPM. Current transmissions are designed to enable the motor to spin at this range regardless of the vehicle speed. This protects the motor from overheating at high RPM and from stalling at low RPM. It is important to note that the ICE motor continues to rotate when the vehicle is stopped and while shifting gears.

The power curve for electric motors is much broader. Current AC motors perform well at 0-15K RPM. Standard EV powertrain designs eliminate the transmission and rely on a gear drive system to provide the correct ratio between motor RPM and wheel speed. The upside to this design is that it is simple and affordable. The down side is that the torque from the motor damages the internal gears to the point that they will fail unless replaced. In addition current gear drive systems require the motor to stop spinning when shifting from forward to reverse and while the EV is stopped for traffic, a red light or for a variety of reasons.

Spooling the EV motor from 0-15K RPM requires a large amount of energy. In addition this spikes the battery pack and greatly reduces the driving range of the vehicle. All of this is avoided with the introduction of the continuously spinning transmission (CST).

Embodiments of the present disclosure illustrate a transmission design which enables the EV motor to spin while the vehicle is stopped or while the operator is shifting gears from forward to reverse. The benefit of the constant spin is that a rotating motor creates a flywheel effect due to centrifugal force. This force greatly reduces the amperage required to maintain the motor RPM and the motion of the EV. One advantage of some embodiments described herein is that the centrifugal force is converted into torque and, therefore, motion when the EV moves in either direction from a dead stop. This is a highly efficient method to overcome inertia.

Referring to FIG. 1, a side view of a torque transfer device 100 is shown. The torque transfer device includes an input shaft 102. In the illustrated embodiment, the input shaft 102 is driven by an electric motor (not shown). The input shaft 102 may be driven by any of a number of rotating power sources including, but not limited to, an electric motor (including an AC motor, DC motor, servomotor, electrostatic motor, etc.), a conventional internal combustion motor, or even manual power sources.

The input shaft 102 is a cylindrical shaft that includes a center disc 104 positioned centrally along a length of the input shaft 102. The center disc 104 is configured to rotate with the input shaft 102. In some embodiments, the center disc 104 is integral with the input shaft 102. In some embodiments, the center disc 104 is of separate construction and is fixedly connected to the input shaft 102 so that the center disc 104 rotates along with the input shaft 102. In the illustrated embodiment, the center disc extends outward in a radial direction from the cylindrical shaft to form an outer surface concentric with the cylindrical shaft of the input shaft 102. The center disc 104 is a uniform thickness measured along the length of the cylindrical axis of the input shaft 102 from a first face of the center disc 104 to a second face of the center disc 104. Some embodiments may include on each face of the center disc 104, a metal facing 106 of copper which in some embodiments may enhance or moderate the magnetic properties of the center disc 104 through electromagnetic principles know to those in the art.

The input shaft 102 and center disc 104 are made of steel. In some embodiments, the input shaft 102 and center disc 104 are made of other magnetic materials. In non-magnetic embodiments, the input shaft 102 and the center disc 104 are made of durable wear resistant materials.

On each side of the center disc 104 are outer discs 108, 110 which are concentrically surrounding the input shaft 102. Bearings (not visible) allow the input shaft 102 to rotate freely from the outer discs 108, 110. That is, the input shaft 102 may rotate at high speeds while either outer disc 108, 110 or both outer discs 108, 110 remain stationary. The outer discs 108, 110 are engaged as they are moved translationally along the input shaft 102 and engage or disengage the center disc 104. That is, as shown in FIG. 1, the first outer disc 108 is positioned in a disengaged position with a relatively large gap 112 between the face of the first outer disc 108 and the face of the center disc 104. With the gap 112, the first outer disc 108 will not rotate with the center disc 104 and the input shaft. The second outer disc 110 is, however, positioned in an engaged position with a relatively small gap 114 between the face of the second outer disc 110 and the opposite face of the center disc 104. With the small gap 114, the magnetic properties of the center disc 104 magnetically interact with embedded magnets (not visible but see, for example, FIG. 6) within the second outer disc 110. The magnetic attraction between the embedded magnets and the center disc 104 will cause the second outer disc 110 to rotate with the center disc 104 and the input shaft 102.

The speed of rotation of the second outer disc 110 may be increased by reducing the gap 114 or decreased by increasing the gap 114 until the gap is large enough to disengage and not cause the second outer disc 110 to rotate. Such a configuration allows the input shaft 102 and the center disc 104 to continue rotating in a continuous manner and only engage the outer discs 108, 110 when needed. Such a configuration allows for the center disc 104 to maintain angular momentum even when the output shaft is completely stopped or when the rotation of the output shaft is reversed. If the input shaft 102 is being induced by an electric motor then the electric motor is not subject to amperage spikes in getting the input shaft to begin rotating. The input shaft can continuously rotate and engage the output shaft when needed.

Each outer disc 108, 110 is mechanically connected to input gears 116, 118. The input gears 116, 118 may, in some embodiments, be integral with the outer discs 108, 110 or, in other embodiments, be fixedly connected to the outer discs 108, 110.

In the illustrated embodiment, the first input gear 116 is a sprocket that is driven by the first outer disc 108. The teeth 124 of the sprocket drive a chain 120 which in turn drives the teeth 162 of a first output gear 152 (or sprocket) on the output shaft 150. The chain 120 will translate the rotational torque of the first input gear 116 to the first output gear 152. The configuration will rotate the output shaft 150 in the same direction as the input shaft 102. Although depicted as a sprocket and chain, the transfer of rotational torque between the first outer disc 108 and the output shaft 150 may be accomplished by other gear combinations known to those skilled in the art. The illustrated embodiment includes a sprocket locator 146. The sprocket locator 146 is configured to keep the sprocket positionally aligned with the first output gear 152 even when the first outer disc 108 is moved translationally along the input shaft 102.

In the illustrated embodiment, the second input gear 118 is a spur gear that is driven by the second outer disc 110. The spur gear drives a second output gear 154 on the output shaft 150. As the teeth 122 of the second input gear 118 interact with the teeth 156 of the second output gear 154, the rotational torque of the second input gear 118 will be transferred to the second output gear 154. The configuration will rotate the output shaft 150 in an opposite direction as the input shaft 102. As such, by moving the outer discs 108, 110 from an engaged position to a disengaged position and back and forth, the rotation of the output shaft 150 may be reversed back and forth, while maintaining a continuous rotation of the input shaft 102. Although depicted as spur gears, the transfer of rotational torque between the second outer disc 110 and the output shaft 150 may be accomplished by other gear combinations known to those skilled in the art.

While depicted and described as a magnetic transmission of power between the center disc 104 and the outer discs 108, 110, the transfer of power between the center disc 104 and the outer discs 108, 110 may be accomplished by other gear transmissions. In magnetic applications, there is no friction or wear between the center disc 104 and the outer discs 108, 110 because they do not contact each other. The outer discs 108, 110 are driven by the magnetic force acting between the center disc 104 and the outer discs 108, 110.

The translational movement of the outer discs 108, 110 along the input shaft 102 is generated in the illustrated embodiment by a shift rail 170 and paddles 172, 174 which interface with the outer discs 108, 110. The shift rail 170 is a cylindrical shaft parallel and eccentric the input shaft.

A first paddle 172 is fixedly connected or fixedly attached to the shift rail 170 at a first end of the first paddle 172. A second end of the first paddle 172 interfaces with a slot 132 in the first outer disc 108. The slot 132 is an indented circumferential slot extending around the first outer disc 108. On each side of the slot 132, circumferential protrusions 126, 128 extend radially outward. The second end of the first paddle 172 interfaces between the circumferential protrusions 126, 128 in the slot 132 to allow translational movement of the shift rail 170 to translationally move the first outer disc 108.

Similarly, a second paddle 174 is fixedly connected or fixedly attached to the shift rail 170 at a first end of the second paddle 174. A second end of the second paddle 174 interfaces with a slot 134 in the second outer disc 110. The slot 134 is an indented circumferential slot extending around the second outer disc 110. On each side of the slot 134, circumferential protrusions 136, 138 extend radially outward. The second end of the second paddle 174 interfaces between the circumferential protrusions 136, 138 in the slot 134 to allow translational movement of the shift rail 170 to translationally move the second outer disc 110.

In some embodiments, the first and second outer discs 108, 110 move simultaneously or in unison as depicted in FIG. 1. In some embodiments, a second shift rail or other configuration allows the outer discs 108, 110 to move independently of each other.

Figure 2:
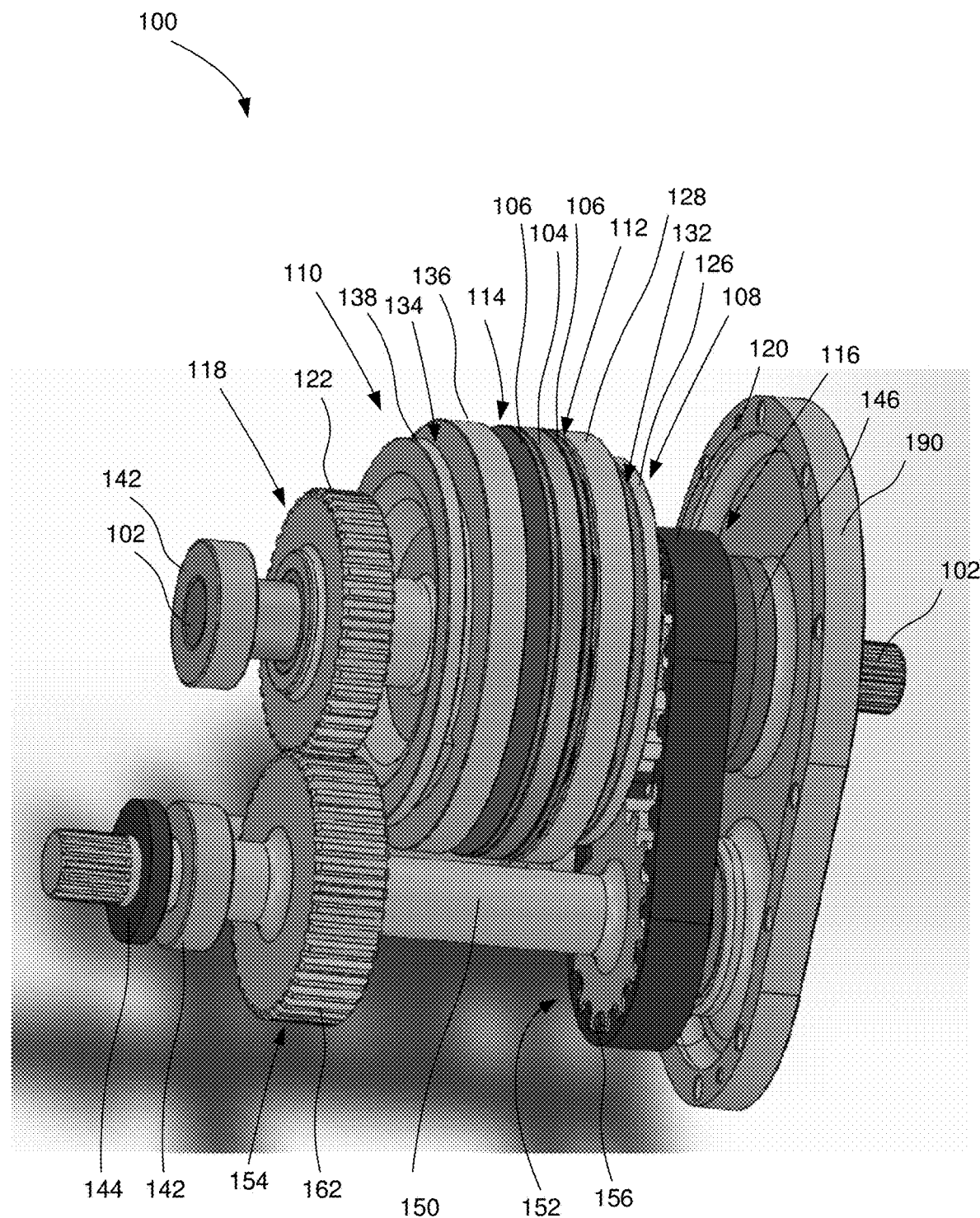
FIG. 2 is a perspective view of a reversible torque transfer device, according to one or more embodiments of the present disclosure.

The output shaft 150 may be connected to any of a variety of machinery including, but not limited to, grinders, pumps, hammer mills, power tools, and vehicle drivetrains. Embodiments are suitable for various electric vehicles including cars, trucks, motorcycles and forklifts. In addition, simplified embodiments described herein are suitable to replace motor controllers, soft starters, transfer cases, couplers and a wide variety of applications for any size electric motor Referring to FIG. 2, an embodiment of a torque transfer device 100 is shown. In the illustrated embodiment, the first outer disc 108 is located in an engaged position and the second outer disc 110 is located in a disengaged position. In such a configuration, the center disc 104 will induce rotation of the first outer disc 108 without inducing rotation of the second outer disc 110. The second outer disc 110 may rotate in an opposite direction of the center disc 104. The center disc 104 will induce rotation of the first outer disc 108 which, in turn, will induce rotation of the first input gear 116, drive chain 120, and first output gear 152. As the first output gear 152 and the output shaft 150 rotate, the second output gear 154 will drive the second input gear 118 and induce a counter rotation of the second outer disc 110 in an opposite direction from the center disc 104. Bearings located between the second outer disc 110 and the input shaft 102 and the second input gear 118 and the input shaft 102 allow for the counter rotation. Also depicted in FIG. 2 is a cover plate 190 of the housing of the reversible torque transfer device 100.

Figure 3:
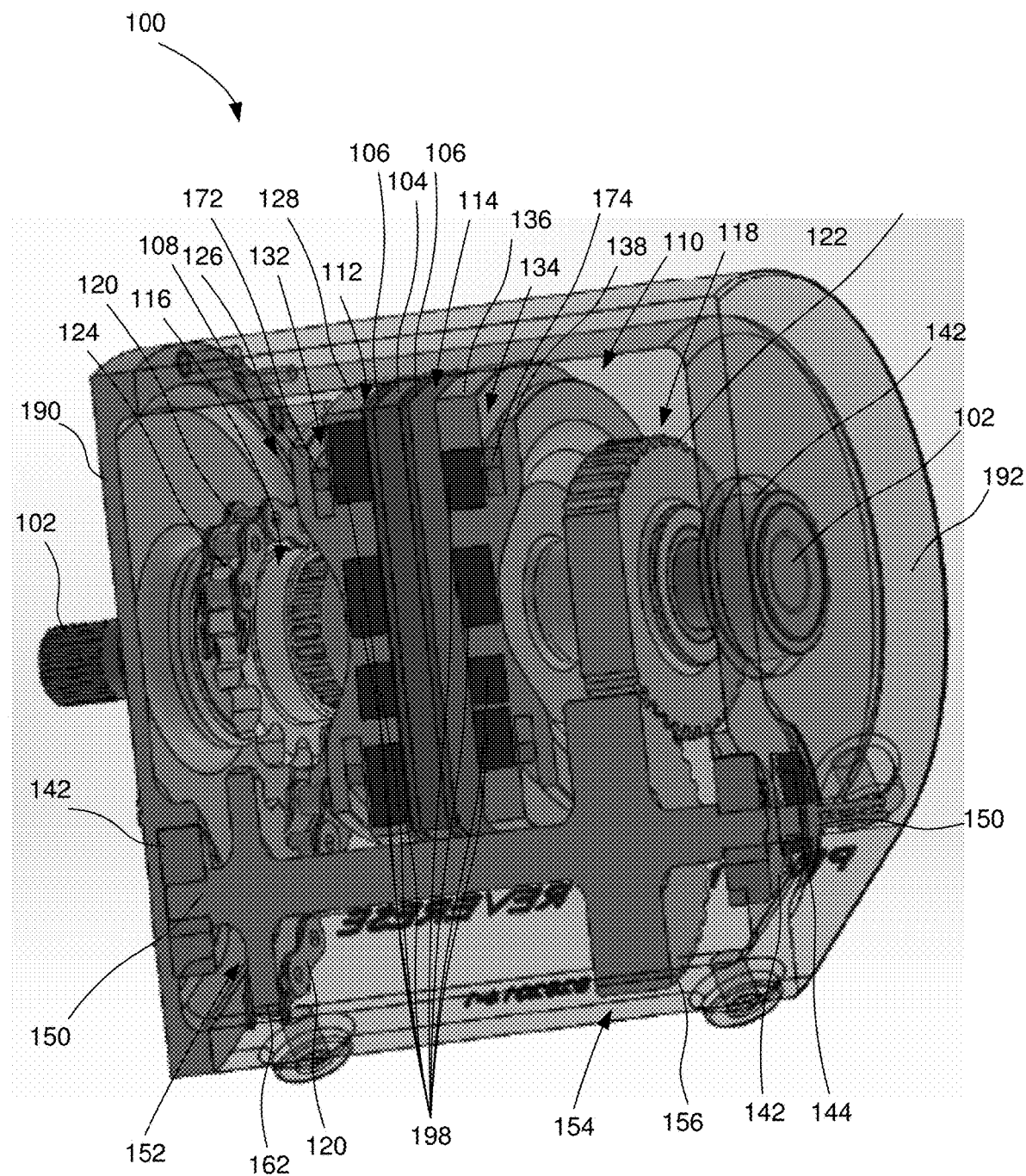
FIG. 3 is a cross-sectional perspective view of a reversible torque transfer device, according to one or more embodiments of the present disclosure.

Referring to FIG. 3, a cross-sectional perspective view of a torque transfer device 100 is shown. Many of the same features are depicted in FIG. 3 that are described above and are not repeated for the sake of brevity. In the illustrated embodiment, a cover plate 190 and housing 192 are shown encasing the torque transfer device 100. In addition, the embedded magnets 198 are shown embedded in the first and second outer discs 108, 110. As described previously, the magnets 198 in the embedded in the first and second outer discs 108, 110 magnetically interact with the center disc 104. By adjusting the distance between the outer discs 108, 110 (and therefore the embedded magnets 198) and the center disc 104, the rotation of the outer discs 108, 110 can be controlled by controlling the distance or gaps 112, 114 between them.

In the illustrated embodiment, the embedded magnets 198 are permanent magnets but the embedded magnets 198 and center disc may also be electromagnets or other types of magnets or some combination of the like.

Figure 4:
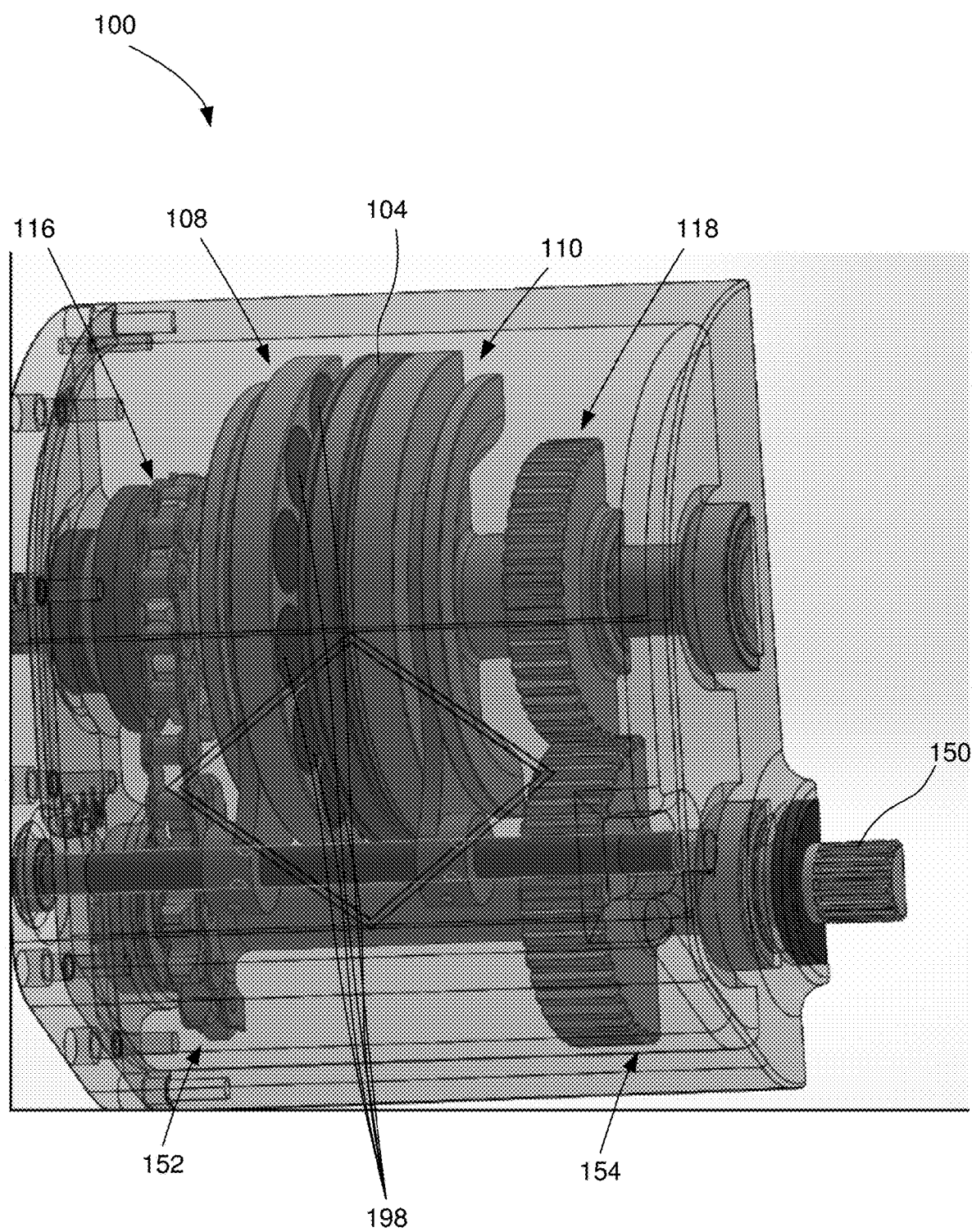
FIG. 4 is a cross-sectional perspective view of a backside of a reversible torque transfer device, according to one or more embodiments of the present disclosure.

Referring to FIG. 4, a perspective view of a torque transfer device 100 is shown. Many of the same features are depicted in FIG. 4 that are described above and are not repeated for the sake of brevity. In the illustrated embodiment, the embedded magnets 198 are shown embedded in the first outer disc 108. By adjusting the distance between the outer discs 108, 110 (and therefore the embedded magnets 198) and the center disc 104, the rotation of the outer discs 108, 110 can be controlled by controlling the distance or gaps 112, 114 between them. In the illustrated embodiment, the first outer disc 108 is located in a disengaged position and the second outer disc 110 is located in an engaged position. In such a configuration, the center disc 104 will induce rotation of the second outer disc 110 without inducing rotation of the first outer disc 108. The first outer disc 108 may rotate in an opposite direction of the center disc 104. The center disc 104 will induce rotation of the second outer disc 110 which, in turn, will induce rotation of the second input gear 118 and second output gear 154. As the second output gear 154 and the output shaft 150 rotate, the first output gear 152 will drive the first input gear 116 and induce a counter rotation of the first outer disc 108 in an opposite direction from the center disc 104. Bearings located between the first outer disc 108 and the input shaft 102 and the first input gear 116 and the input shaft 102 allow for the counter rotation.

Figure 5:
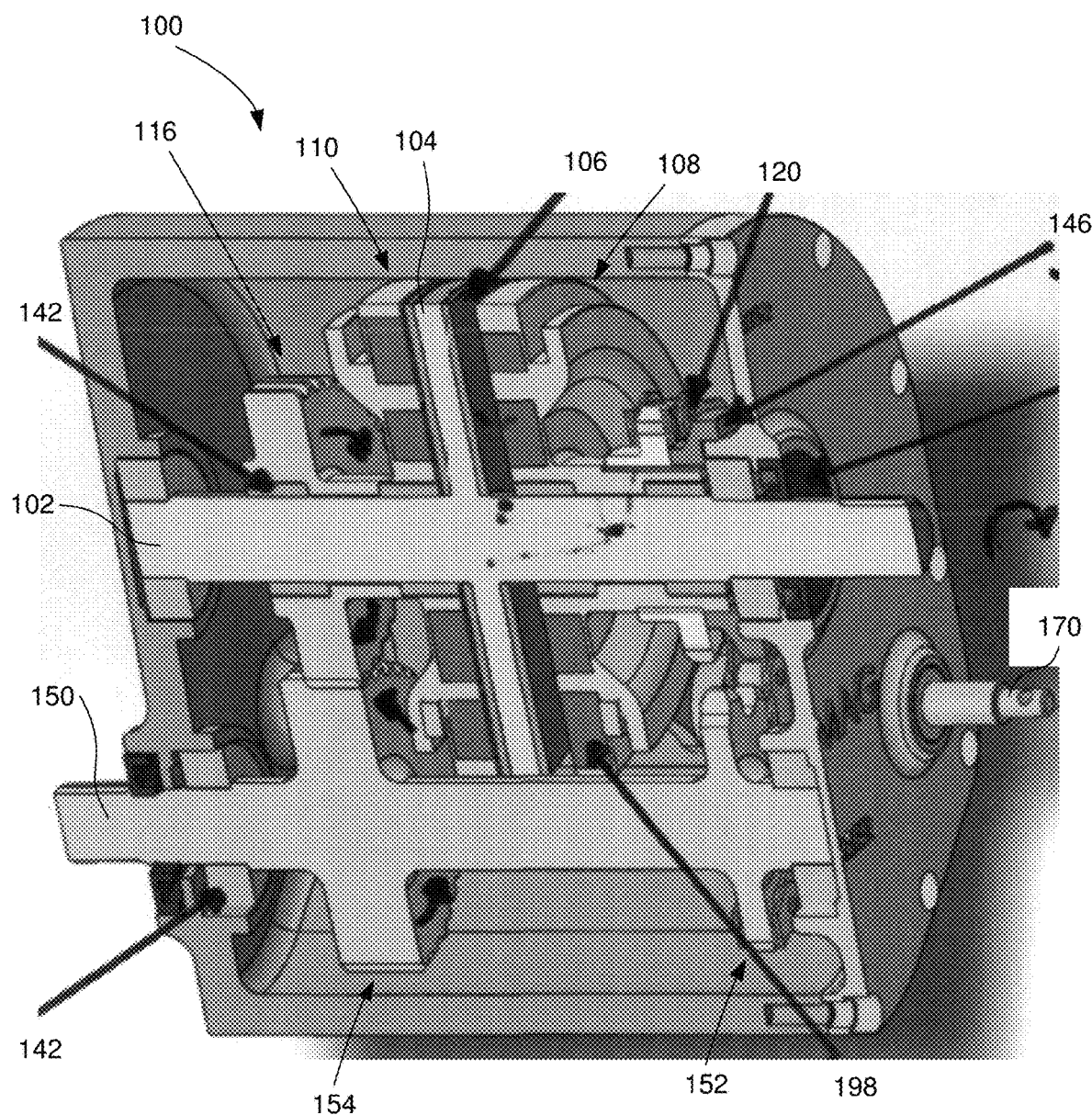
FIG. 5 is a cross-sectional perspective view of a reversible torque transfer device, according to one or more embodiments of the present disclosure.

Referring to FIG. 5, a cross-sectional perspective view of a torque transfer device 100 through the plane of the input and output shafts is shown. In the illustrated embodiment, the input shaft 102 and center disc 104 form an integral part. In addition, the output shaft 150 and the first and second output gears 152, 154 form an integral part. In FIG. 5, the second outer disc 110 is shown in an engaged position and the first outer disc 108 is shown is a disengaged position. Such a configuration results in the output shaft 150 rotating in an opposite direction from the input shaft 102.

Figure 6:
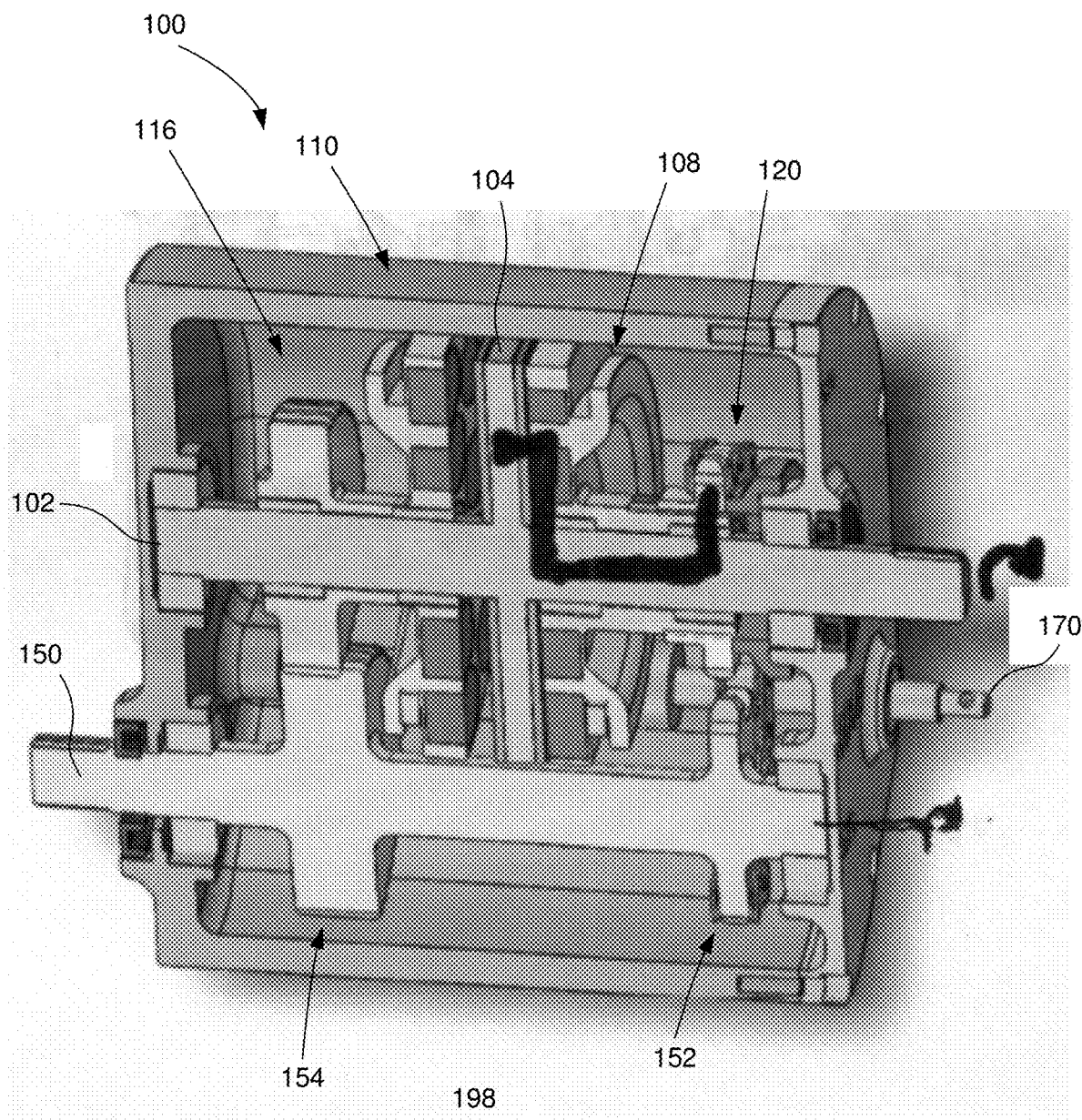
FIG. 6 is a cross-sectional perspective view of a reversible torque transfer device, according to one or more embodiments of the present disclosure.

Referring to FIG. 6, a cross-sectional perspective view of a torque transfer device 100 through the plane of the input and output shafts is shown. In the illustrated embodiment, the input shaft 102 and center disc 104 form an integral part. In addition, the output shaft 150 and the first and second output gears 152, 154 form an integral part. In FIG. 6, the second outer disc 110 is shown in a disengaged position and the first outer disc 108 is shown is an engaged position. Such a configuration results in the output shaft 150 rotating in a same direction as the input shaft 102.

Figure 7:
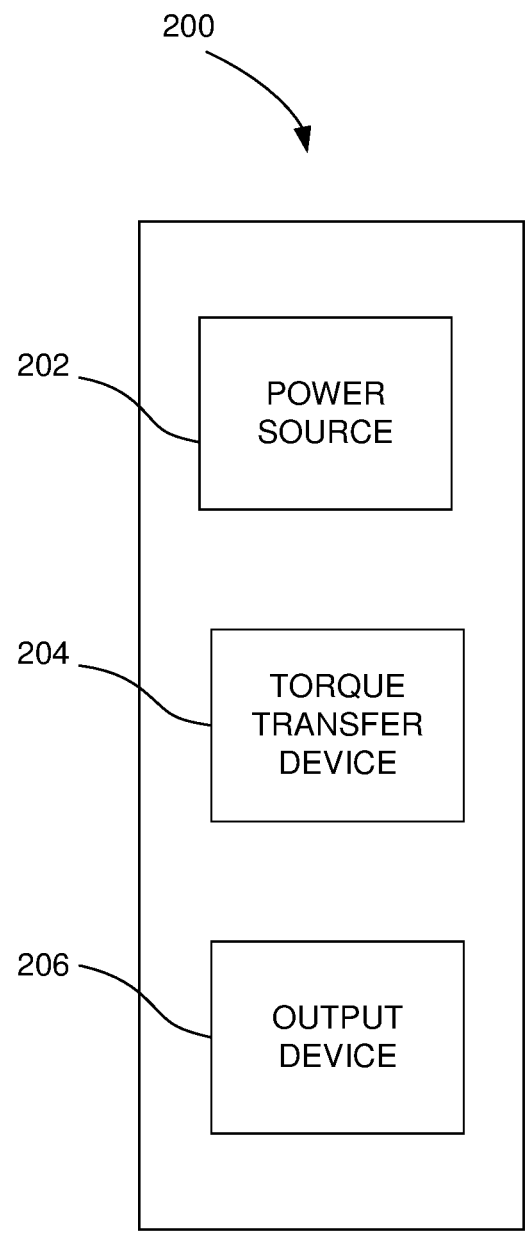
FIG. 7 is a schematic diagram of a system, according to one or more embodiments of the present disclosure.

Referring to FIG. 7, a schematic diagram of a system 200 according to one or more embodiments is shown. The system 200 includes a power source 202, a torque transfer device 204, and an output device 206. The power source 202 may include any of the examples described herein including, but not limited to, a rotational power source, an electric motor (including an AC motor, DC motor, servomotor, electrostatic motor, etc.), a conventional internal combustion motor, or manual power sources, etc. The power source 202 drives the input shaft of the torque transfer device 206. The output shaft of the reversible torque transfer device 100 drives the output device 204. The output device may be any of the examples described herein including, but not limited to, grinders, pumps, hammer mills, power tools, vehicle drivetrains, etc.

The torque transfer device 204 may take many forms including the various embodiments described above. In some embodiment, the torque transfer device 204 includes an input shaft with a magnetic disc that is configured to drive a single outer disc on a first side of the magnetic disc. The single outer disc concentrically surrounds the input shaft and is configured to move translationally along the input shaft. The outer disc is further configured to rotate an input gear. The input gear is mechanically connected to the output gear of an output shaft. The magnetic disc is configured to drive the outer disc and concurrently the input gear based on a translational position of the outer disc along the input shaft and based on the distance of the outer disc to the magnetic disc. Such a clutch configuration would only have a single outer disc and not two outer discs as described above in conjunction with FIGS. 1-6.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed:

1. A reversible torque transfer device, comprising:
an input shaft comprising a center disc;
an output shaft comprising a first output gear and a second output gear;
a first outer disc on a first side of the center disc, the first outer disc concentrically surrounding the input shaft and being configured to move translationally along the input shaft, the first outer disc being configured to rotate a first input gear, the first input gear being mechanically connected to the first output gear, wherein the center disc drives a rotational movement of the first outer disc based on a translational position of the first outer disc along the input shaft and magnetic force; and
a second outer disc on a second side of the center disc, the second outer disc concentrically surrounding the input shaft and being configured to move translationally along the input shaft, the second outer disc being configured to rotate a second input gear, the second input gear being mechanically connected to the second output gear, wherein the center disc drives a rotational movement of the second outer disc based on a translational position of the second outer disc along the input shaft and magnetic force, wherein one of the first outer disc, the second outer disc, or the center disc comprises a magnet.

2. The reversible torque transfer device of claim 1, wherein the center disc comprises a combination steel and embedded magnets.

3. The reversible torque transfer device of claim 2, the input shaft further comprising one of a metallic and magnetic facing on each side of the center disc.

4. The reversible torque transfer device of claim 3, wherein the metallic facing is copper.

5. The reversible torque transfer device of claim 1, the input shaft being configured to connect to an electric motor.

6. The reversible torque transfer device of claim 1, wherein the output shaft is eccentric to the input shaft.

7. The reversible torque transfer device of claim 1, wherein the output shaft is configured to connect to an output machinery.

8. The reversible torque transfer device of claim 7, wherein the output machinery comprises a drivetrain of an electric vehicle.

9. The reversible torque transfer device of claim 1, the first outer disc comprising embedded permanent magnets.

10. The reversible torque transfer device of claim 9, the second outer disc comprising embedded permanent magnets.

11. The reversible torque transfer device of claim 10, wherein a smaller distance between the first outer disc and the center disc induces a larger rotational speed of the first outer disc and first input gear relative to a larger distance between the first outer disc and the center disc which induces a smaller rotational speed of the first outer disc and first input gear.

12. The reversible torque transfer device of claim 11, wherein a smaller distance between the second outer disc and the center disc induces a larger rotational speed of the second outer disc and second input gear relative to a larger distance between the second outer disc and the center disc which induces a smaller rotational speed of the second outer disc and second input gear.

13. The reversible torque transfer device of claim 1, further comprising:
a shift rail;

a first paddle fixedly connected to the shift rail at a first end of the first paddle and interfaced with the first outer disc at a second end of the first paddle, wherein translational movement of the shift rail moves the first outer disc along the input shaft;

a second paddle connected to the shift rail at a first end of the second paddle and interfaced with the second outer disc at a second end of the second paddle, wherein translational movement of the shift rail moves the second outer disc along the input shaft.

14. The reversible torque transfer device of claim 1, wherein the center disc is integral with the input shaft.

15. The reversible torque transfer device of claim 1, wherein the center disc is configured to rotate with the input shaft.

16. The reversible torque transfer device of claim 1, wherein the output shaft is eccentric to the input shaft.

17. The reversible torque transfer device of claim 1, wherein the output shaft is parallel and eccentric to the input shaft.

18. The reversible torque transfer device of claim 1, the first outer disc and the second outer disc being configured to move translationally along the input shaft simultaneously.

\* \* \* \* \*